E. C. CHAMBERLIN.
SPECTACLE PLIERS.
APPLICATION FILED OCT. 15, 1917.
1,259,078.
Patented Mar. 12, 1918.
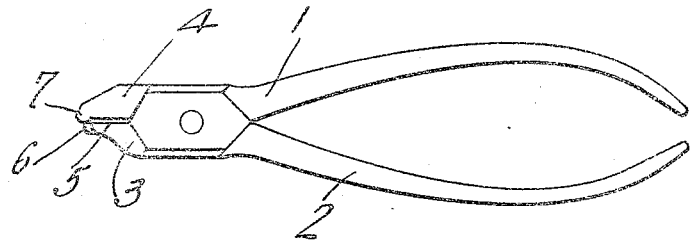
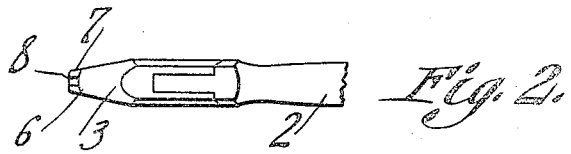
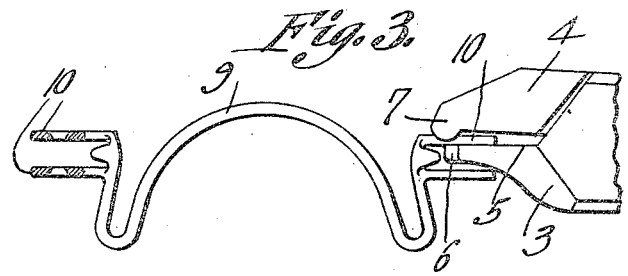
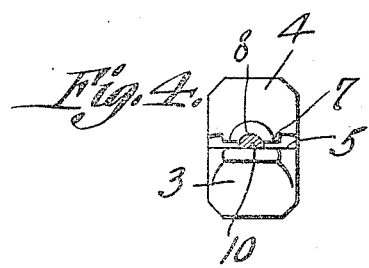
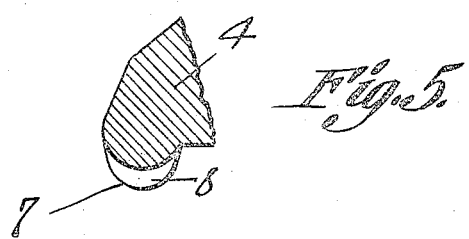
Witness
Inventor
E. C. Chamberlin
By
Attorneys

UNITED STATES PATENT OFFICE.

ELZIE C. CHAMBERLIN, OF DENISON, IOWA.

SPECTACLE-PLIERS.

1,259,078.

Specification of Letters Patent.   Patented Mar. 12, 1918.

Application filed October 15, 1917.   Serial No. 196,730.

*To all whom it may concern:*

Be it known that I, ELZIE C. CHAMBERLIN, a citizen of the United States, residing at Denison, in the county of Crawford and State of Iowa, have invented a new and useful Spectacle-Pliers, of which the following is a specification.

The present invention relates to a tool designed for stretching or elongating the apertured straps of a rimless spectacle mounting, and it is the object of the invention to provide novel and improved pliers for that purpose, in order that the straps between which the lenses are secured, can be elongated to accommodate the apertures of the lenses when they are located farther from the edges of the lenses than that for which the mounting is made.

It is also the object of the invention to provide a tool whereby the straps can be lengthened so that their apertures correctly register with the holes drilled in the lenses, and whereby the job will be neat and strong, without weakening either the mounting or lenses.

When the rivets, screws or other securing elements are engaged through the lenses and elements are engaged through the lenses and straps, with said straps shorter than they should be, due to the location of the holes of the lenses farther from the edges than that for which the straps were intended, this will serve to create a breaking pressure on the lenses between said holes and the edges of the lenses adjacent to the mounting, which not infrequently causes the lenses to break off. With the present pliers the strap can be elongated to properly receive the securing elements, and avoid such breaking pressure.

It is also the object of the invention to provide spectacle pliers for the purposes indicated, which will be extremely simple and inexpensive in construction, as well as being thoroughly practical and efficient in use.

With the foregoing and other objects in view, which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

The invention is illustrated in the accompanying drawings, wherein:

Figure 1 is a side elevation of the pliers.

Fig. 2 is another elevation thereof, looking at right angles to the line of view in Fig. 1, the handles being partially broken away.

Fig. 3 is an enlarged elevation of the jaws as in use.

Fig. 4 is an end view of the jaws.

Fig. 5 is an enlarged sectional detail showing the die of one jaw for elongating the strap.

The pliers comprises the crossed and pivoted levers 1 and 2 adapted to be swung toward one another by the hand, and provided at one end with the jaws 3 and 4, respectively. The jaw 3 is slightly shorter than the jaw 4 and the face thereof confronting the jaw 4 is flat, as at 5, and provides an anvil. The end of the jaw 3 is preferably rounded and thin.

The jaw 4 is provided at the end thereof with a transverse rib 7 projecting toward the plane of the anvil face 5 and end 6 of the jaw 3. The rib 7 is rounded transversely, and the end of the jaw 3 terminates between the opposite sides of the rib 7. That portion of the jaw 4 in rear of the rib 7 is spaced from the jaw 3, and the rib 7 provides a die for lengthening or elongating the strap of the spectacle mounting. Said rib or die 7 is provided intermediate its ends with a notch 8 transversely of said rib and longitudinally of the jaw 4, and said notch is concaved longitudinally of the rib or transversely of the jaw, as seen in Fig. 4, and convexed transversely of the rib or longitudinally of the jaw, as seen in Fig. 5. This enables the rib or die to properly and effectively fit the strap. The end of the jaw or anvil 3 overlaps the rib and extends across the notch 8.

In Fig. 3, there is illustrated an ordinary rimless spectacle mounting including the bridge 9 and the pairs of straps 10 at the ends thereof having apertures for the anchoring of the lenses between said straps as usual. The straps 10 are malleable, so that they can be bent or worked to conform to the lenses. In using the present implement, the thin end of the jaw anvil 3 is inserted between the straps, as seen in Fig. 3, with the strap to be elongated resting flatly on the anvil surface and projecting rearwardly thereon. The mounting is so arranged that the notch 8 of the rib or die 7 will fit snugly over the respective strap 10 between the eye of said strap and the bridge. Then, by applying pressure to the pliers, the rib or die 7 will mash the strap 10 down the desired amount on the jaw or anvil 3, said strap being prevented from appreciable transverse widening; due to the fact that the strap fits within the notch 8, so that the rib straddles the strap, while the curvature of the notch 8, as seen in Fig. 5, will cause the pressure applied to the strap to elongate said strap. The amount of elongation is determined by the amount of pressure applied, and the strap can be shifted longitudinally slightly on the jaw or anvil 3, when further elongation is required. The indentation formed on the strap by the rib or die will hardly be discernible, and will be curved in harmony with the formation of the strap. Each of the straps 10 of the mounting can, therefore, be elongated the desired amount, so that the apertures thereof will register or coincide with the holes in the lenses when they are inserted and moved into place between said straps. The flat anvil surface 5 maintains the inner side of the strap flat to fit the surface of the lens.

The device can not only be used for elongating the straps of spectacle mountings, but can be used in a similar way for stretching or elongating parts of other articles.

Having thus described the invention, what is claimed as new is:

1. Pliers having a pair of jaws, one providing an anvil, the other having a rib projecting toward the anvil to mash an article thereon for elongating it, said rib having a notch to fit the article, and the notch being concaved longitudinally of the rib and convexed transversely thereof.

2. Pliers having a pair of jaws, one providing an anvil, the other having a transverse rib at the end thereof projecting toward the anvil for mashing an article thereon to elongate it, the anvil overlapping said rib, said rib having a notch intermediate its ends.

3. Pliers having a pair of jaws, one providing an anvil, the other having a transverse rib at the end thereof projecting toward the anvil for mashing an article thereon to elongate it, the anvil overlapping said rib, said rib having a notch intermediate its ends, and said notch being concaved longitudinally of the rib and convexed transversely thereof.

In testimony that I claim the foregoing as my own, I have hereto affixed my signature in the presence of two witnesses.

ELZIE C. CHAMBERLIN.

Witnesses:
E. W. PIERCE,
W. E. TERRY.

Copies of this patent may be obtained for five cents each, by addressing the "Commissioner of Patents, Washington, D. C."